United States Patent [19]
Shiba et al.

[11] Patent Number: 5,608,714
[45] Date of Patent: Mar. 4, 1997

[54] STRUCTURE FOR SUPPORTING DISC STOCKERS IN A DISC CHANGER WITH A MANUALLY OPERABLE RELEASE LEVER

[75] Inventors: Katsuhiro Shiba; Minoru Goto; Takao Yamada; Norihisa Kato; Jun Takahashi; Kenji Okuda; Kenji Muratani, all of Saitama-ken, Japan

[73] Assignee: Pioneer Electronic Corporation, Tokyo, Japan

[21] Appl. No.: 310,398

[22] Filed: Sep. 22, 1994

[30] Foreign Application Priority Data

Sep. 29, 1993 [JP] Japan .................................. 5-243394

[51] Int. Cl.[6] ............................. G11B 17/22; G11B 17/08
[52] U.S. Cl. ........................ 369/178; 369/192; 360/98.04
[58] Field of Search ............................ 369/178, 36, 38, 369/75.2, 191, 192, 194; 360/98.04, 98.06

[56] References Cited

U.S. PATENT DOCUMENTS

| | | | |
|---|---|---|---|
| 4,170,030 | 10/1979 | Castrodale et al. | 369/38 |
| 4,599,716 | 7/1986 | Shimbo | 369/36 |
| 4,833,552 | 5/1989 | Agostini et al. | 369/191 |

Primary Examiner—Stuart S. Levy
Assistant Examiner—Kevin M. Watkins
Attorney, Agent, or Firm—Nikaido, Marmelstein, Murray & Oram LLP

[57] ABSTRACT

A supporting device is provided for supporting disc stockers in a case of a disc changer. Each of the disc stockers stores a plurality of discs. A lock device is mounted on each of side walls of the disc stocker. The lock device comprises a lock lever slidably mounted on the side wall and having a locking hook, and a manually operated release lever. The locking hook is provided to engage with a pin provided on the case so as to lock the disc stocker. The release lever is arranged to release the lock lever from the pin.

2 Claims, 17 Drawing Sheets

STRUCTURE FOR SUPPORTING DISC STOCKERS IN A DISC CHANGER WITH A MANUALLY OPERABLE RELEASE LEVER

BACKGROUND OF THE INVENTION

The present invention relates to an automatic disc changer for a disc player, and more particularly to a structure for supporting disc stockers each of which stores a plurality of discs such as video discs.

Recently, singalong systems using video discs (laser disc) or graphic compact discs have become popular. In the singalong system, a user manually sets a disc, or an automatic disc changer system may be provided. In the automatic disc changer system, a disc selected by the user is automatically taken out and reproduced. After reproducing, the disc is automatically returned to a storing position. The changer system comprises a commander for controlling a selecting operation and a plurality of automatic changers each of which is operated to change and reproduce the disc.

Referring to FIG. 20, an example of a conventional automatic disc changer 1 has a rectangular body mounted on four wheels. A plurality of detachable stockers 10, each of which carrying discs 11 stacked in two columns, are provided in the disc changer 1. Two disc player units 30 are disposed on the bottom of the disc changer. A disc carrier 20 vertically slides in the disc changer 1 to take out a disc 11 from the stocker and sets it on one of the player units 30 when playing, and to retrieve from the player and return the disc in the stocker when the player stops playing. It is convenient to provide two player units 30 so that while one of the units is playing a disc, another disc is selected and set on the other unit, thereby enabling the instantaneous playing of discs without a break.

Referring to FIG. 21, in order to mount the stockers 10 in the disc changer 1, each stocker is provided with a T-shaped projection 12 formed on the back thereof. An inner panel 3 having a plurality of vertically aligned openings 2 adapted to engage with the projection 12 of the stocker 10 is provided in the disc changer 1.

When loading the stocker 10 in the disc changer 1, the stocker is held by the hands of an operator at a position where the projection 12 confronts one of the openings 2. The stocker 10 is pushed further inside so that the projection 12 is inserted through the opening 2, as shown in FIG. 22. When the stocker 10 is slightly lowered, as shown in FIG. 23, the projection 12 engages with the lower periphery of the opening 2, thus holding the stocker 10. Each stocker 10 is hence vertically loaded in the disc changer 1 one by one. Upon unloading, the stocker 10 is lifted slightly upward to release the engagement between the opening 2 and the projection 12 and then drawn out.

Only a minimum space is provided between each stocker 10 so as to decrease the size of the disc changer 1. However, since a space wherein the stocker may be vertically moved is needed to allow the projection 12 to be inserted through the opening 2, the stocker 10 can only be loaded from the bottom. Similarly, the stocker can only be taken out of the disc changer 1 from the top. More particularly, when taking out one of the stockers, all of the stockers positioned above the particular stocker must be first taken out. Thus, the stockers are taken out with tedious operation, thereby complicating the operation for controlling the discs.

For example, it is apparent that the shorter the distance between the stocker and the player unit, the quicker the operation for setting the disc provide therein. Particularly in the case where the player units 30 are disposed at the lower portion of the disc changer 1 as in the example of FIG. 21, the discs in the bottom stocker have the easiest access to the player unit. Hence it is advisable to store the discs which are most frequently played in the bottom stocker. However, to exchange the discs in the stockers or to change the positions of the stockers, an awkward operation as described above must be carried out.

Such a problem can only be solved by increasing the space between the stockers, thereby rendering the disc changer inadmissibly large.

SUMMARY OF THE INVENTION

An object of the present invention is to provide a disc changer wherein stockers can be easily loaded in and taken out of the disc changer.

According to the present invention there is provided a structure for supporting disc stockers in a case of a disc changer, each of the disc stockers has opposite side walls and stores a plurality of discs, comprising a pair of side panels provided in the case, a supporting member provided on each of the side panels for supporting the disc stocker, a lock device mounted on each of the side walls of the disc stocker, each of the lock device including a lock lever movably mounted on the side wall and having a locking hook, and a manually operated release lever, and a pin provided on the side panel so as to engage with the locking hook.

The release lever is arranged to release the lock lever from the pin engaged with the locking hook.

The lock lever is slidably mounted on the side wall, and the release lever is pivotably mounted on the side wall, and operatively connected to the lock lever at an end thereof.

The other objects and features of this invention will become understood from the following description with reference to the accompanying drawings.

DETAILED DESCRIPTION OF THE PREFERRED EMBODIMENT

Figure 1:
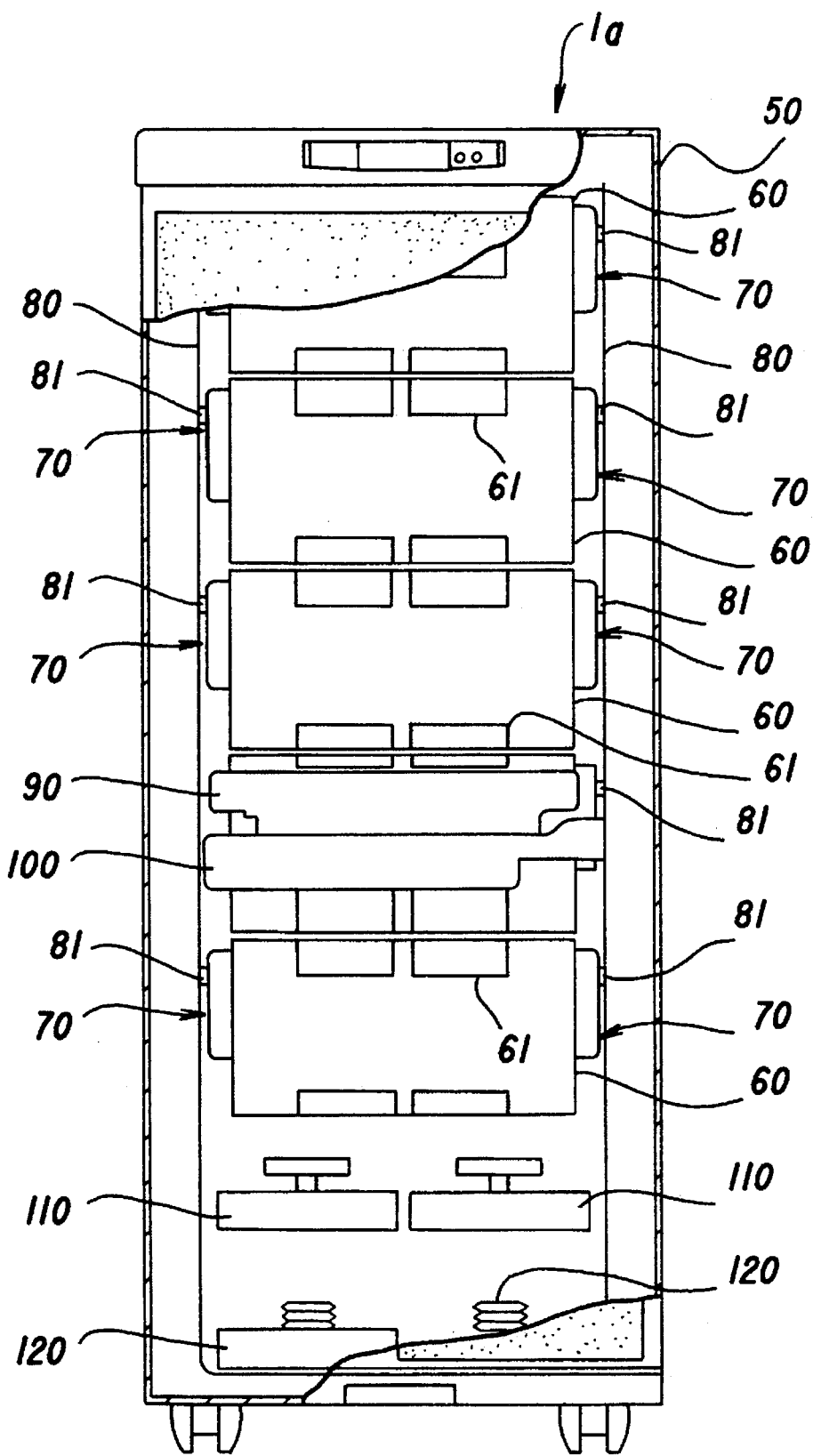
FIG. 1 is a partially cutaway elevational view of a disc changer according to the present invention.

Referring to FIG. 1, an automatic disc changer 1a according to the present invention has a vertically disposed rectangular case 50 mounted on casters. In the case 50 are provided a pair of vertical side panels 80, on inner sides of which are hung a plurality of detachable stockers 60 by way of pins 81 and locking devices 70. The locking device 70 will be described later in detail. Each stocker 60 stores a plurality of discs 61 vertically stacked in right and left columns.

Further provided in the case 50 is a disc carrier 90 pivotally mounted on a base 100, and a pair of upper disc player units 110 and a pair of lower disc player units 120 disposed in a lower portion of the body 50 under the stockers 60. The disc carrier 90 vertically moves along the side panels 80 to carry one of the discs 61 in the stocker 60 to one of the player units 110 and 120 so as to be played.

Figure 2:
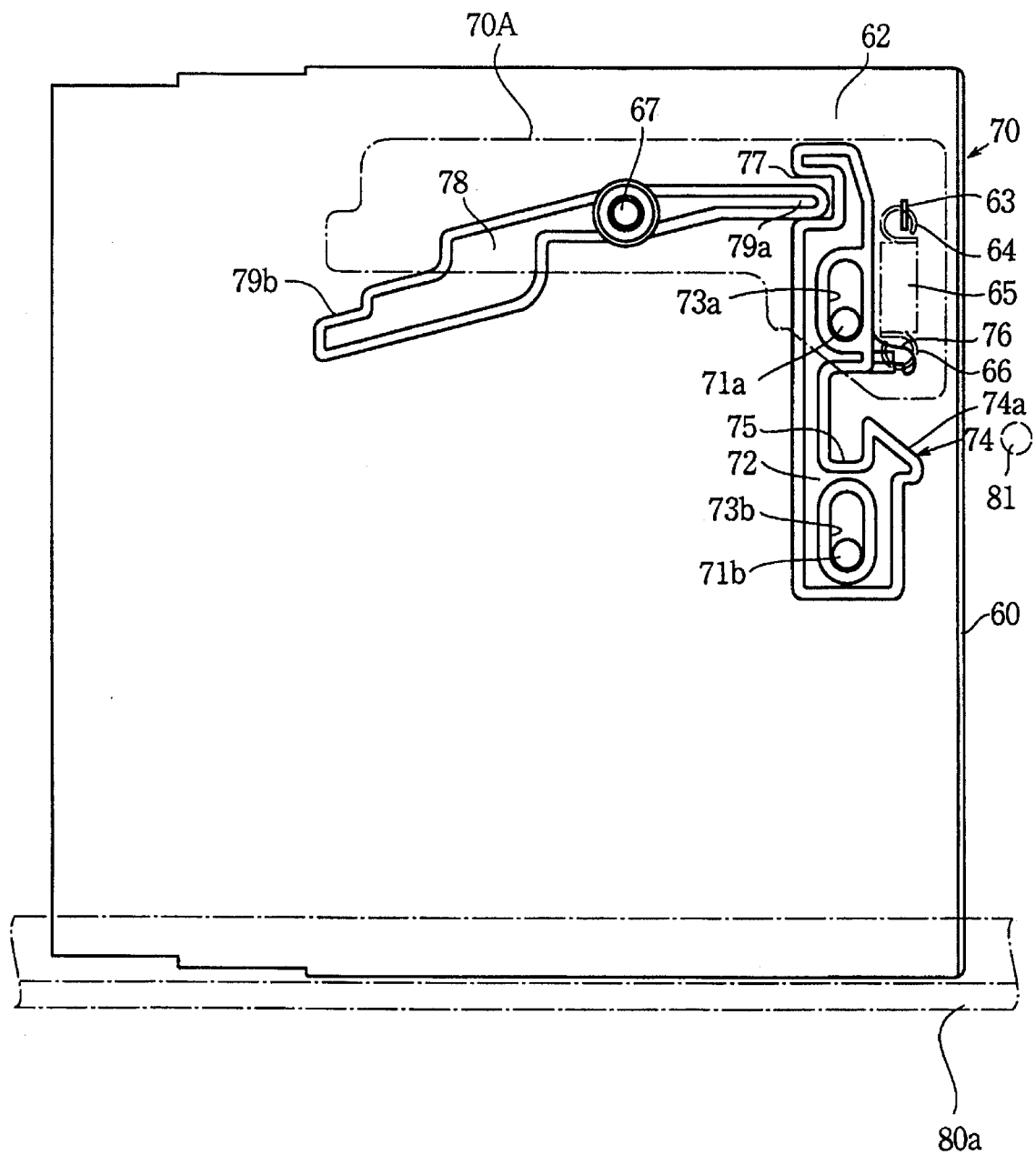
FIG. 2 is a side view of a stocker provided in the disc changer of FIG. 1.

Referring to FIG. 2 showing in detail the locking device 70 provided on each of the right and left sides of each stocker 60, the locking device 70 comprises a laterally extending release lever 78 and a vertically extending lock lever 72. The release lever 78 is pivotally mounted on an upper portion of a side plate 62 of the stocker 60. One end 79b of the release lever is a free end while the other end 79a engages with a recess 77 formed on an upper end of the lock lever 72. The lock lever 72 has oblong upper and lower holes 73a and 73b. The holes 73a and 73b engage with guide pins 71a and 71b, respectively, each of which is secured to the side plate 62 of the stocker 60.

The lock lever 72 further has a hook 76. A coil spring 65 having one end 64 attached to a projection 63 formed on the side plate 62 is connected to the hook 76 at the other end 66, thereby urging the lock lever 72 upwardly.

A locking hook 74 comprising a slanted portion 74a and an adjacent recess 75 are formed in the lock lever 72 at a position between the holes 73a and 73b. A pin 81 mounted on the side panel 80 is adapted to contact with the slanted portion 74 and engage with the recess 75 when the stocker 60 is loaded in the disc changer 1a. An L-shaped cover 70A covers the locking device 70 as shown in FIG. 3.

Figure 3:
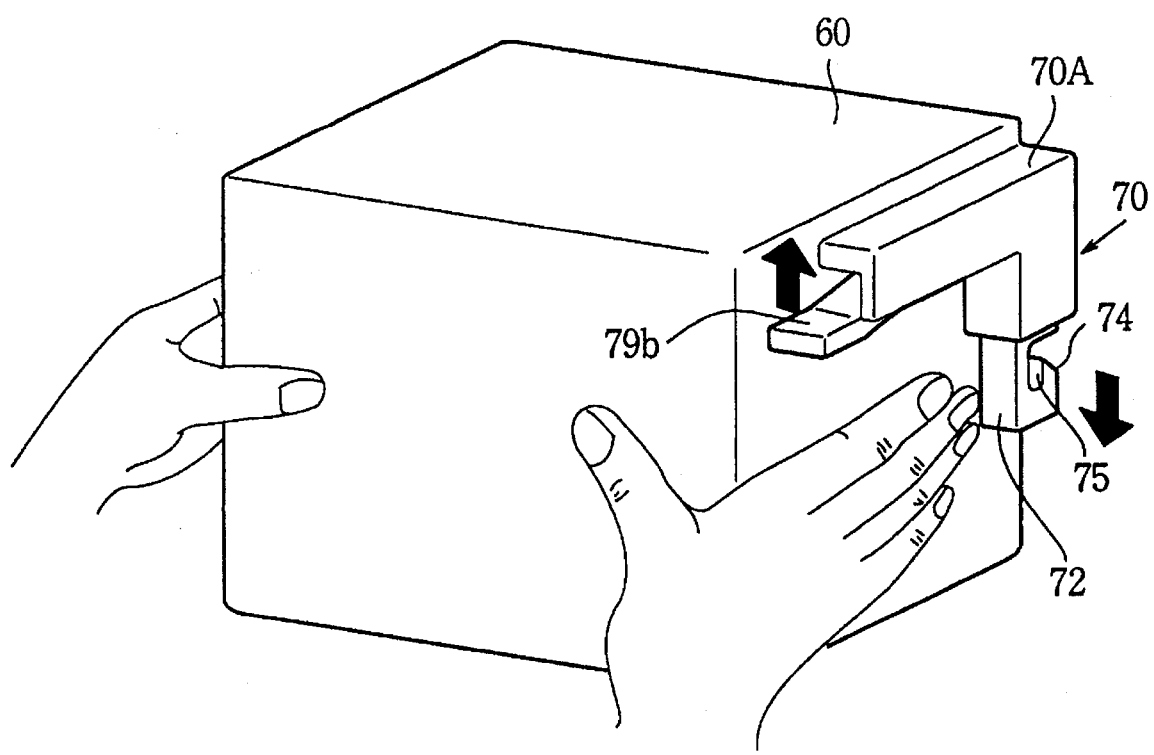
FIG. 3 is a perspective view of the stocker explaining the operation of a locking device thereof.

In order to load the stocker 60 wherein discs 61 are stored, the stocker is held with both hands as shown in FIG. 3, and inserted into the case 50 of the disc changer 1a from the front. The stocker 60 is pushed so as to slide on guide members 80a provided on the inner wall of the side panels 80.

When the slanted portion 74 engages with the pin 81 and slides on the pin, the pin 81 pushes down the lock lever 72 against the urging of the spring 65. As the stocker 60 is further inserted inward, the pin 81 engages with the recess 75 of the lock lever 72, which causes the lock lever 72 to return to its initial position by the urging of spring 65. Hence, the stocker 61 is firmly mounted on the guide members 80a of the side panels 80 in the case 50.

When taking out the stocker 60, the stocker is again held with both hands. The free end 79b of the release lever 78 projects out of the cover 70A so as to be operated by the fingers. Namely, the end 79b is raised with the index finger, that is the finger closest to the end 79b, thereby rotating the release lever 78 about the pin 67. The other end 79a inserted in the recess 77 of the lock lever 72 pushes the lock lever downward against the urging of the spring 65. As a result, the pin 81 is released from the recess 75. The stocker 60 is thus disengaged from side panels 80 and horizontally drawn forward. When the finger is released from the release lever, the lock lever 72 returns to its initial position.

The stockers 60 are thus horizontally inserted into and taken out of the case 50, needing little space between the stockers. Hence the stocker may be stored at any desired position of the disc changer 1a, or any chosen stocker may be taken out without removing other stockers. As a result, it becomes possible to easily change the discs in the stocker or to change the positions of the stockers without enlarging the size of the disc changer.

Figure 4:
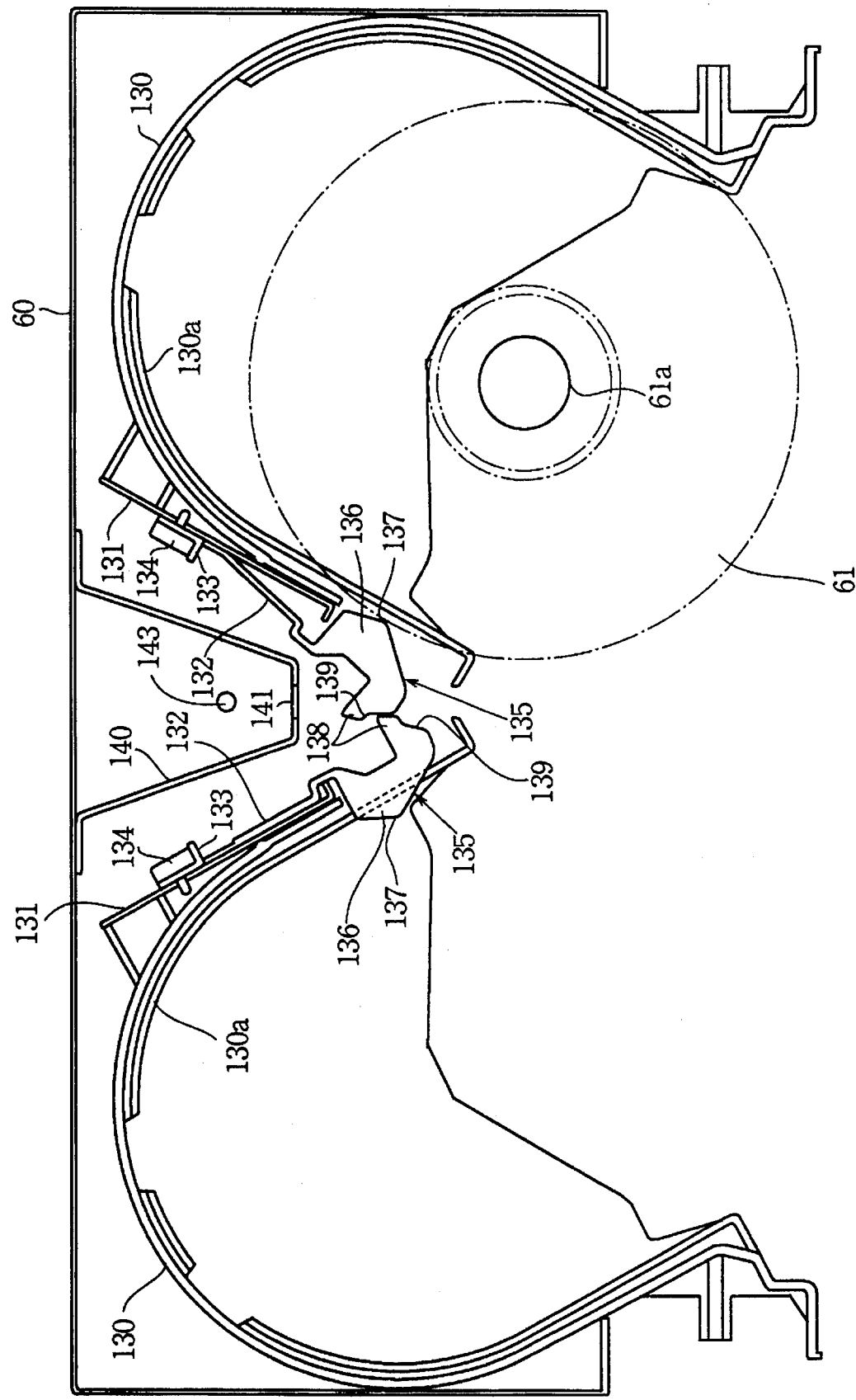
FIG. 4 is a sectional view of the stocker.

The inner construction of the stocker 60 is described hereinafter in detail. Referring to FIG. 4, the stocker 60 has a plurality of U-shaped disc holders 130, disposed in pairs alongside one another, each for holding one disc. Each disc holder 130 has an inner supporter 130a along the inner periphery thereof for guiding and holding the periphery of the disc 61. A part of the side periphery of the disc holder 130 abuts on a supporting plate 131. Attached to the supporting plate 131 is one end 133 of a resilient leaf spring 132 by way of a screw 134. The other end 135 of the leaf spring 132 forms a U-shaped stopper 136 having a bottom lobe 137, a side lobe 139 and a projection 138 at the upper end of the stopper 136.

When the disc 61 is inserted in the holder 130, the bottom lobe 137 of the stopper 136 is outwardly moved by the disc 61 which is shown by a dash-dot line in FIG. 4. The projection 138 is disengaged from that of the adjacent disc holder 130, the side lobe 139 engaging therewith instead. Hence the leaf spring 132 is prevented from further being moved in the outer direction by the disc 61 so as to prevent the disc 61 from slipping out of the supporter 130a.

Figure 5:
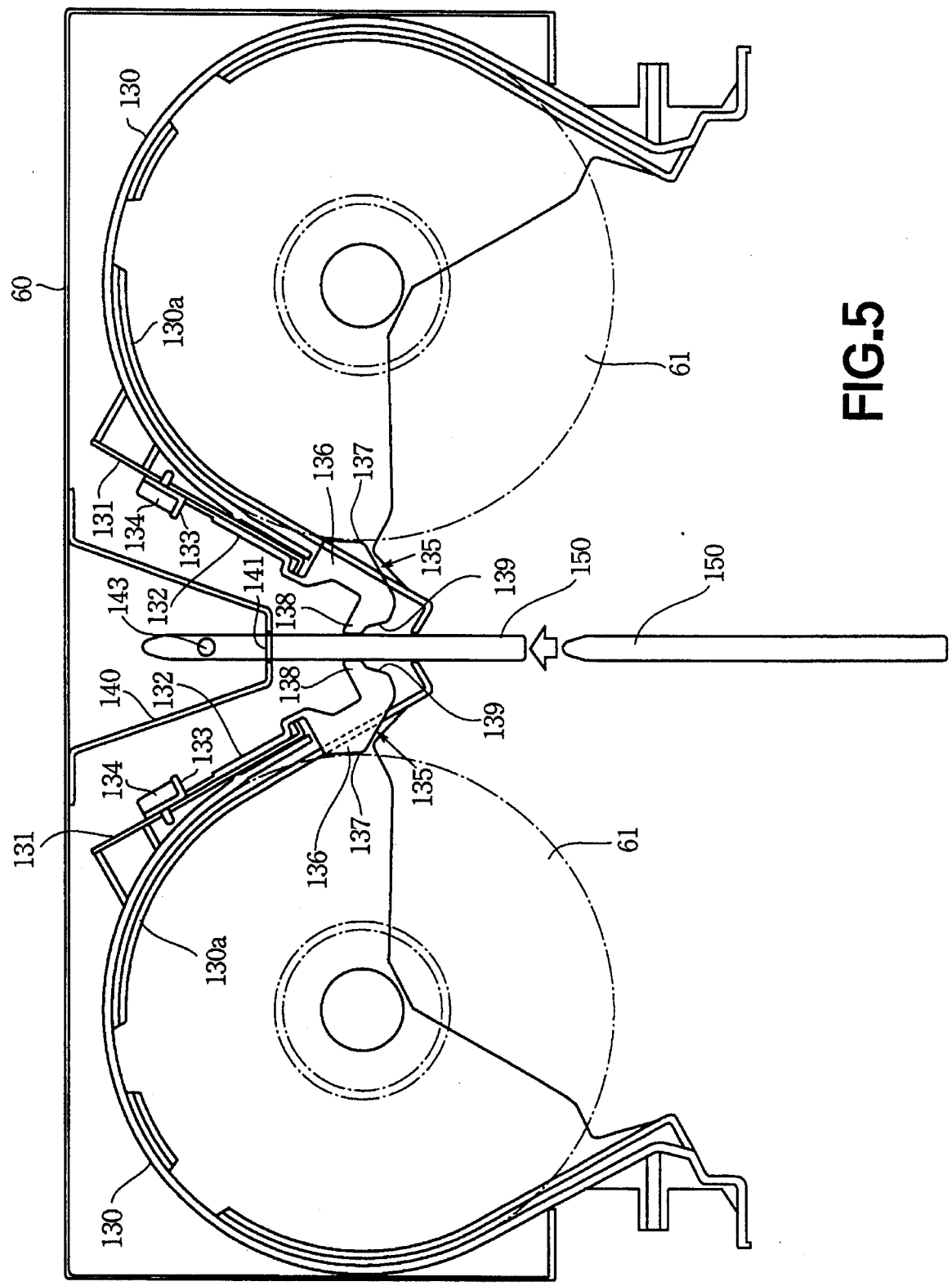
FIG. 5 is a sectional view of the stocker when a shipping plate is inserted.

When the disc 61 is completely held within the disc holder 130 as shown in FIG. 5, the resilience of the leaf spring 132 causes the stopper 136 thereof to forcibly abut against the periphery of the disc 61 to hold it.

Figure 6:
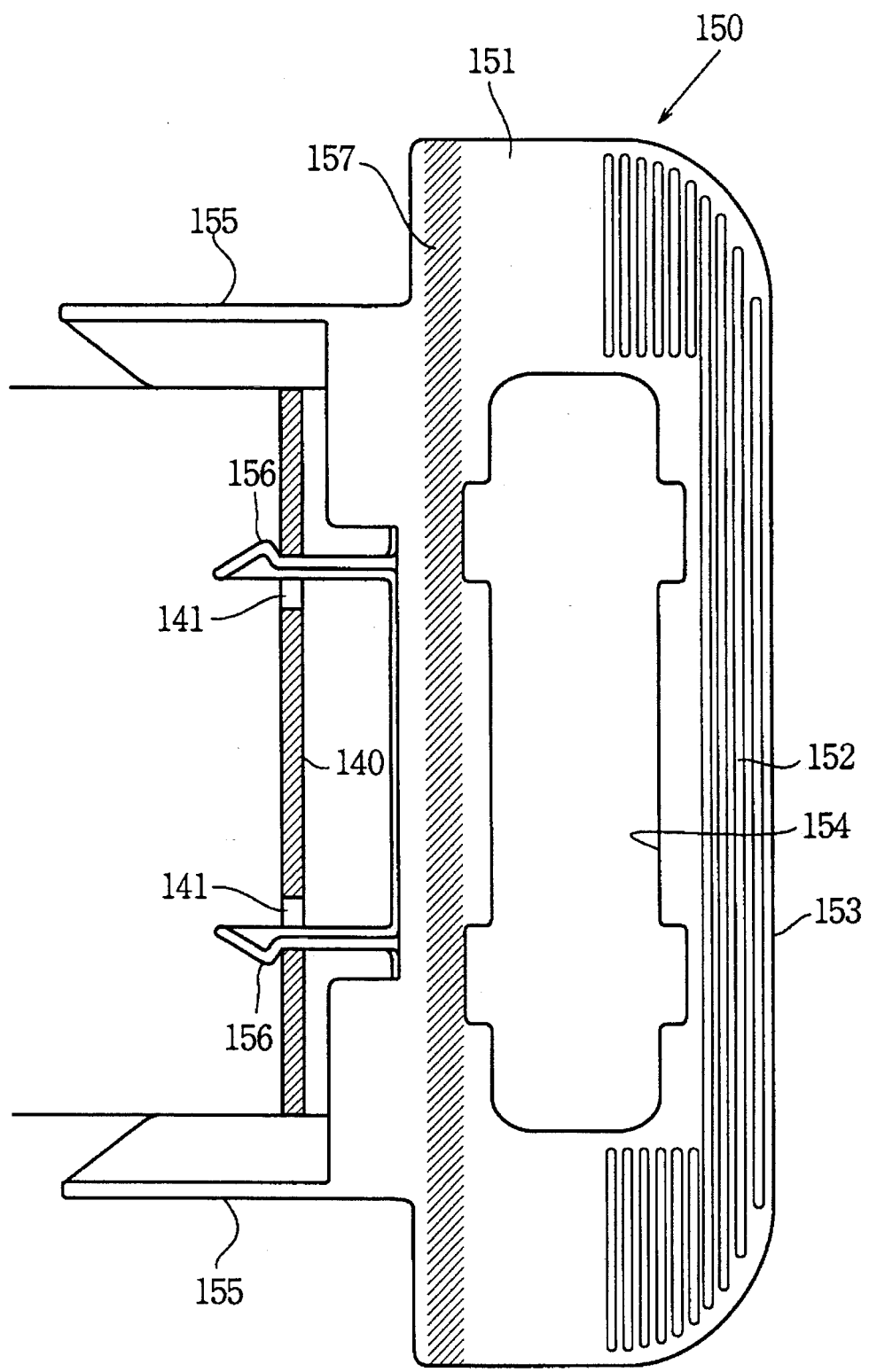
FIG. 6 is an elevational view of the shipping plate of FIG. 5.

Referring back to FIG. 4, further mounted in the stocker 60 is a plate holder 140 comprising a plate bent to form a V. The plate holder 140 is attached on the rear wall of the stocker 60 between the right and left columns of disc holders 130. As shown in FIGS. 5 and 6, a shipping plate 150 is attached to the plate holder 140 to prevent the discs 61 from slipping out of the disc holder 130 and hence out of the stocker 60 when the disc changer 1a is moved. Namely, the discs 61, which are resiliently kept in the disc holder 130 by the leaf spring 132, must be pulled out by the disc carrier 90 with ease. In order to do so, the resilience of the leaf spring 132 is relatively small, so that the discs are apt to slip out when vibrations are generated. The shipping plate 150 is hence set to securely hold the discs 61 in their respective places.

Referring to FIG. 6, the shipping plate 150 comprises a body 151 having a grip 153 defining an opening 154 through which fingers are inserted. On the grip 153 are formed a plurality of anti-slip ribs 152 to prevent one's hand from slipping. Fine oblique strokes are engraved to form a strip 157 on either side of the body 151. The body 151 further has a pair of upper and lower outer projections 155 which engage with the upper and lower edges of the plate holder 140, and a pair of resilient upper and lower inner projections 156 which engage with respective holes 141 formed in the plate holder 140.

When the shipping plate 150 is inserted in the stocker 60, the outer projections 155 engage with the upper and lower edges of the plate holder 140 while the inner projections 156 are firmly engaged in the holes 141. As shown in FIG. 5 the projections 138 of the stopper 136 for the right and left disc holder 130 abut upon the engraved strip 157, thereby preventing the stopper 136 from yielding outward. Hence the discs 61 are reliably held in the holder 130.

A hole 143 is formed in each of the top and bottom plates of the stocker 60 at a position corresponding to an area enclosed by the plate holder 140 and to the shipping plate 150. A light emitting means (not shown) and a light receiving means (not shown) are provided in the upper portion and the lower portion of the case 50, respectively, so as to transmit light through the holes 143 of each stocker. Namely, when all of the stockers are correctly positioned, the holes 143 thereof are aligned, thereby allowing the light to be transmitted from the emitting means to the receiving means. Hence the user may detect that the disc changer is ready for operation. In addition, when one of the shipping plates 150 is inserted, the projections 155 thereof block the light from being transmitted through the holes 143.

The disc carrier 90 will now be described hereinafter with reference to FIGS. 7 to 19.

Figure 7:
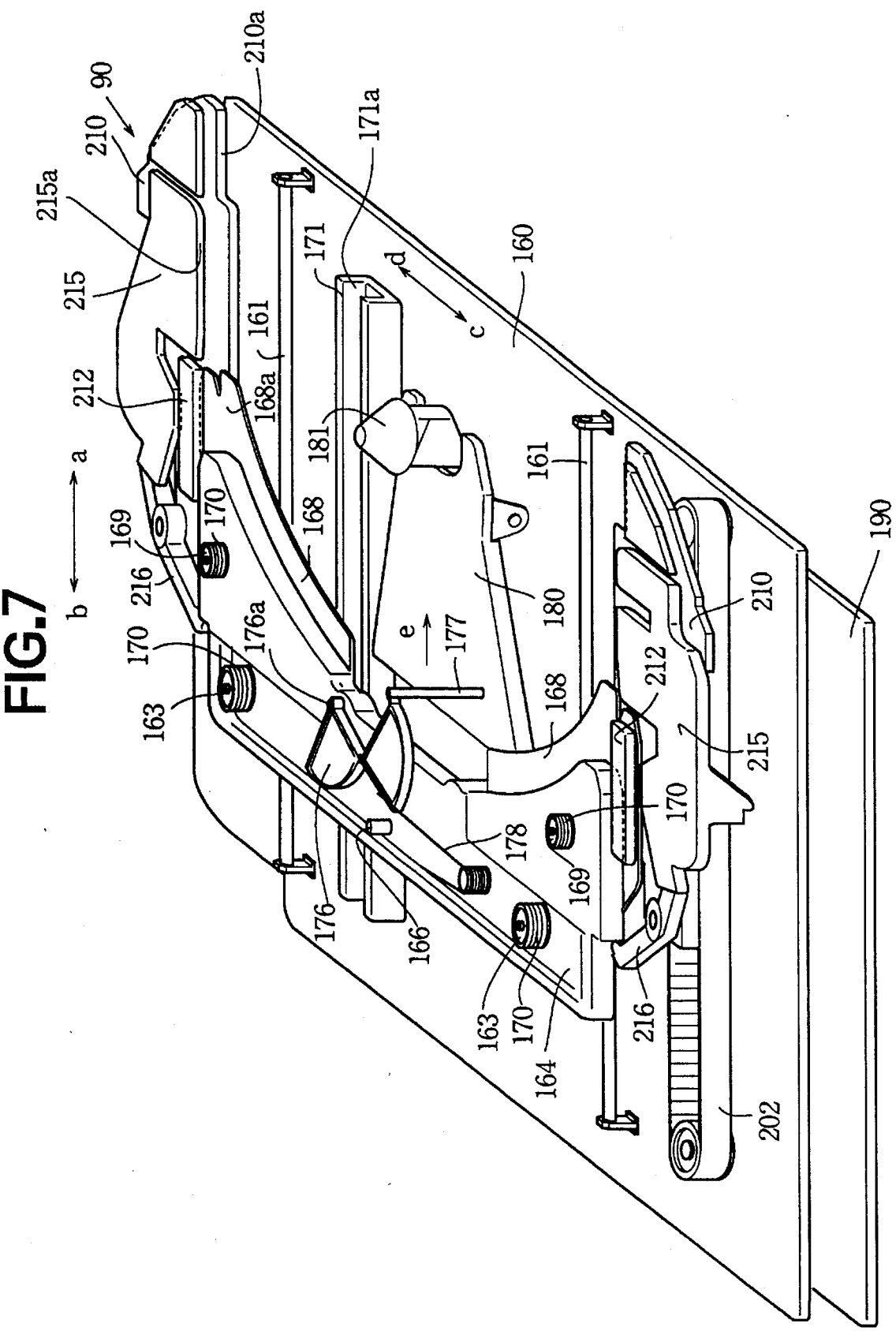
FIG. 7 is a perspective view of a disc carrier provided in the disc changer of FIG. 1.
Figure 11:
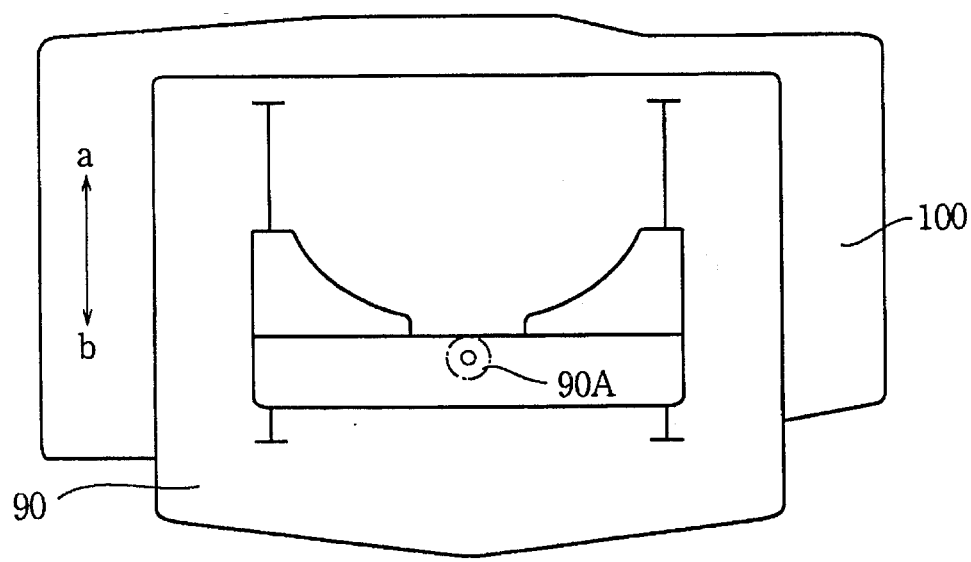
FIGS. 11 and 12 are illustrations explaining a pivotal movement of the disc carrier.
Figure 12:
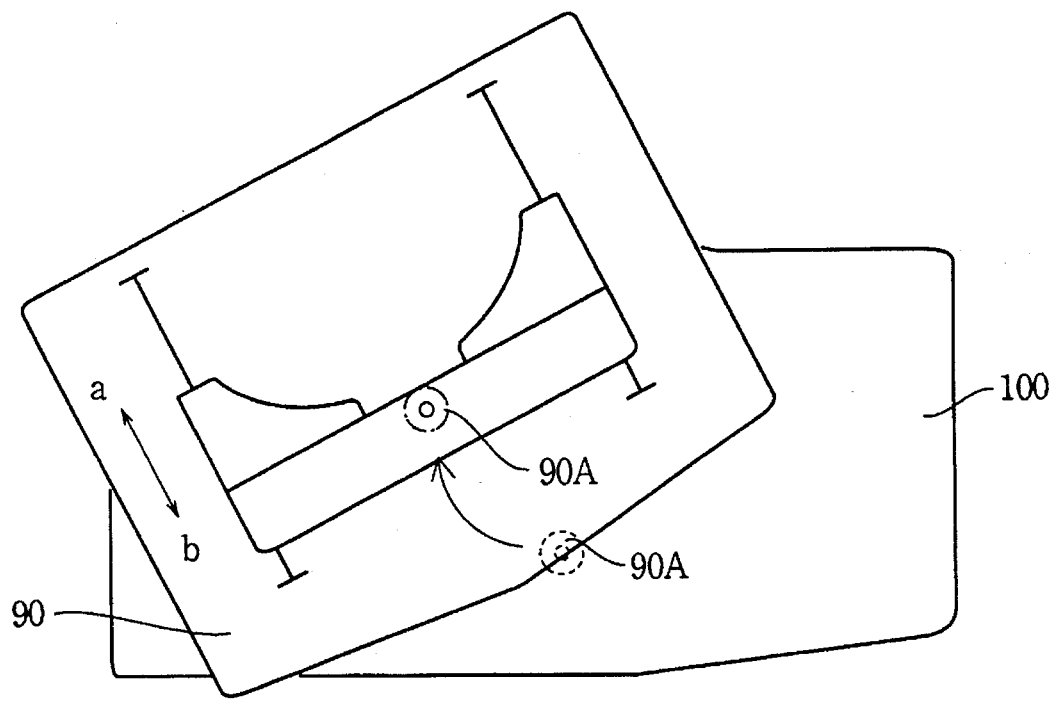

Referring to FIG. 7, the disc carrier 90 has a main base 190 which is pivotally mounted on the base 100 (FIG. 11). As shown in FIGS. 11 and 12, the main base 190 is so constructed as to rotate about a pivot 90A, the position of which deviates forward at the same time, thereby enabling the disc 61 in the stocker to be easily taken out. For further details, refer to Japanese Patent Application No. 1-19555.

Figure 9:
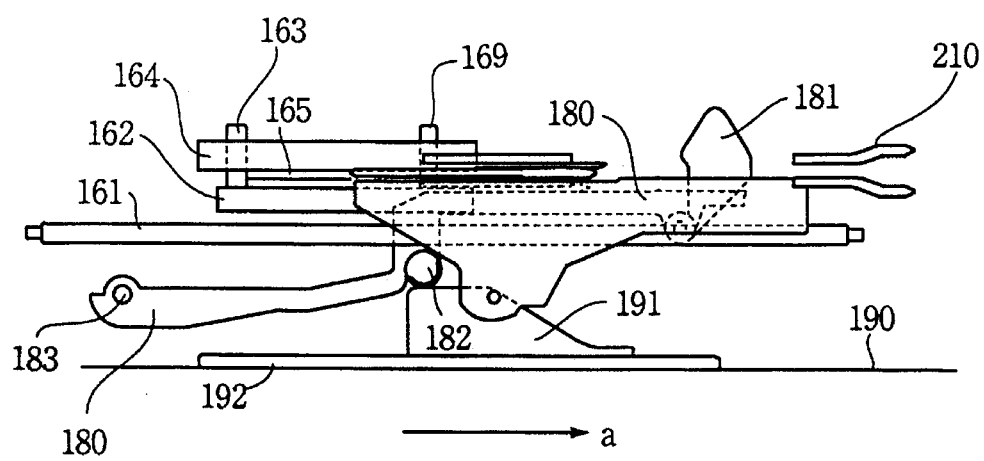
FIG. 9 is a sectional view showing a part of the disc carrier.
Figure 10:
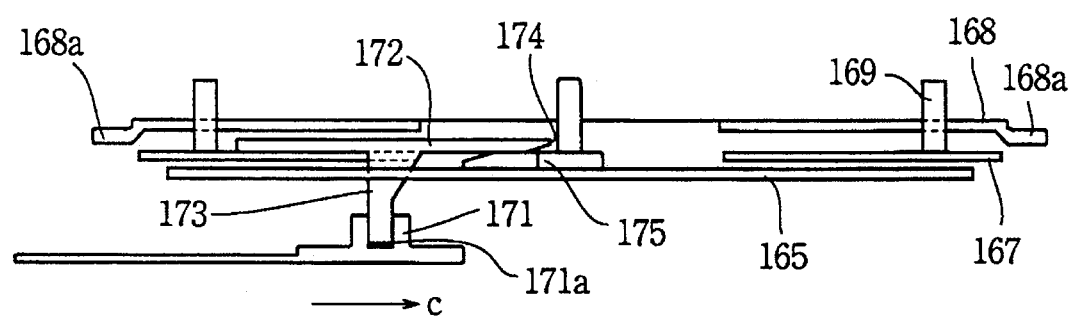
FIGS. 10a and 10b are illustrations explaining the operation of the disc changer for retrieving a disc.
Figure 10:
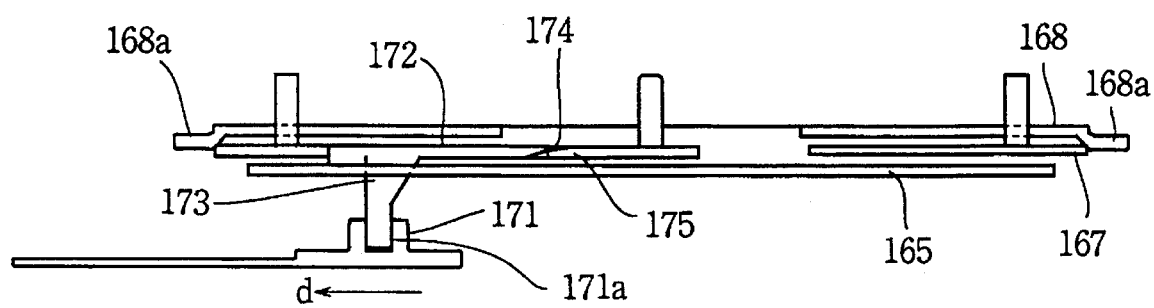

Mounted on the main base 190 is a base plate 160 on which are mounted a pair of parallel lateral guide rails 161. A lower base member 162 (FIG. 9) is slidably engaged with the guide rails 161 so as to slide thereon. An upper base member 164 is securely mounted on the lower base member 162 by a pair of pins 163. As shown in FIG. 9, a chuck holder 165 is provided between the lower and upper base member 162 and 164. Attached to the chuck holder 165 is a pin 166 which penetrates the upper base member 164.

Referring to FIG. 10a, a slider 172 having a downwardly extending projection 173 is provided between the chuck holder 165 and the upper base members 164. The chuck holder 165 supports a lower chuck member 167 having a pin 169, and an upper chuck member 168 is mounted on the upper base member 164. Coil springs 170 are wound around the pins 163 and 169, thereby forming a space between the upper chuck member 168 and the lower chuck member 167. The upper chuck member 168 has a horned shape, thereby forming a pair of guide projections 168a at its front ends, and a pair of slant portions 168b (FIG. 8) at the rear sides thereof. Further mounted on the chuck holder 165 is an abutting member 175 having a slant portion 174.

Figure 8:
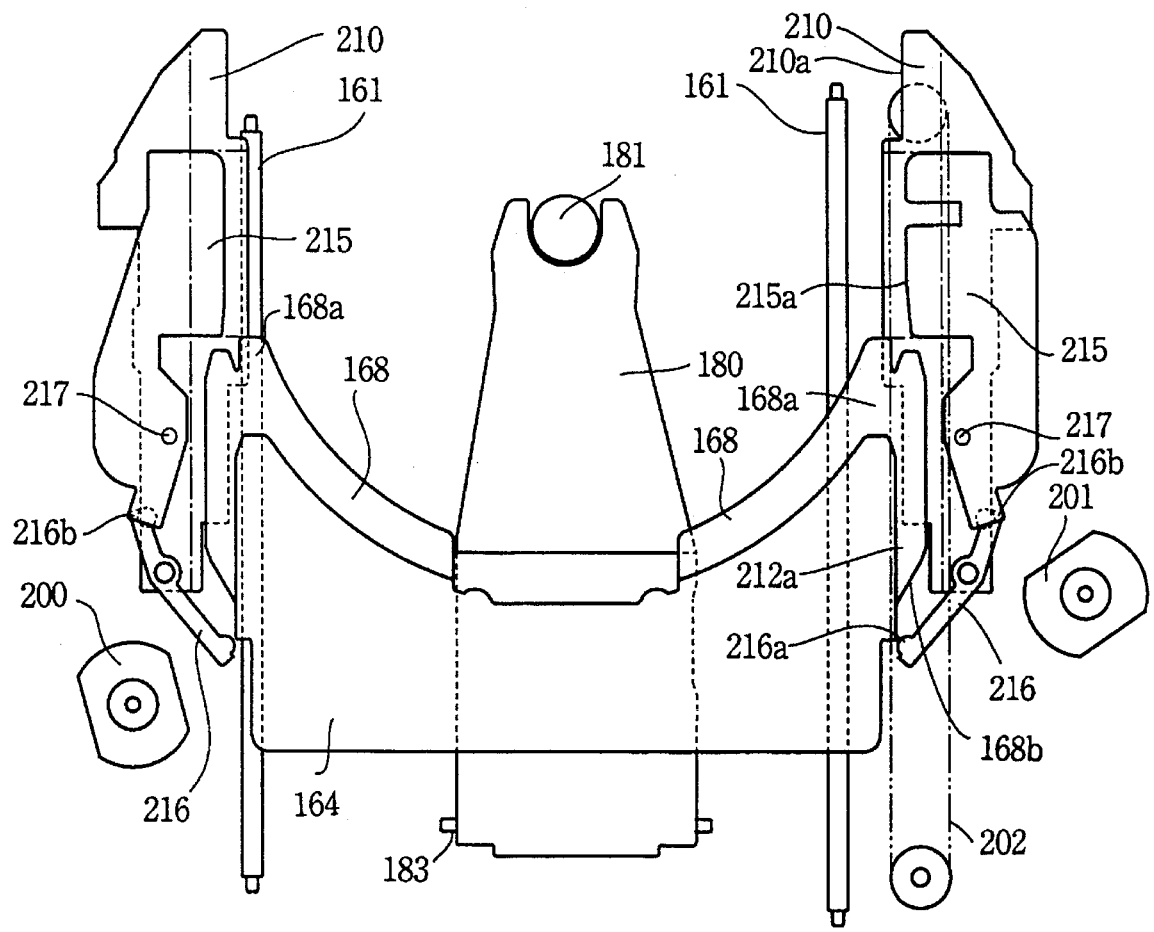
FIG. 8 is a plan view schematically showing a part of the disc carrier.

A guide member 171 having a groove 171a is mounted on the base plate 160 adjacent one of the guide rails 161. The guide member 171 is moved in directions c and d as shown by arrows in FIG. 7 by a motor 200 (FIG. 8). The projection 173 of the slider 172 is engaged in the groove 171a as shown in FIG. 10a.

When the guide member 171 is moved in the direction c by the motor 200 as shown in FIG. 10a, one end of the slider 172 engages with the slant portion 174 of the abutting member 175 and slides thereon, I hereby enlarging the distance between the upper chuck member 168 and the chuck holder 165, and the lower chuck member 167 against the urging of the coil springs 170. Thus, the disc 61 can be inserted in the space between the upper and lower chuck members.

When the guide member 171 returns toward the direction d as shown in FIG. 10b, the slider 172 also slides in the same direction, so that the upper surfaces of the slider 172 and the abutting member 175 are substantially in the same plane. As a result, the coil springs 170 urges the chuck holder 165 upward, thereby decreasing the distance between the upper and lower chuck members 168 and 167 to firmly hold the outer periphery of the disc 61.

A rotating member 176 is pivotally mounted about a pin 176a on the upper base member 164 as shown in FIG. 7. The rotating member 176 has a downwardly extending abutting pin 177 against which the disc 61 abuts when held by the chuck members 167 and 168. The rotating member 176 is urged by a spring 178 in a direction e shown in FIG. 7.

The upper and lower base members 162 and 164 are moved by motor 201 (FIG. 8) through a belt 202 in directions a and b along the guide rail 161. When grasping the disc, the base members 162 and 164 are moved in the direction a, thereby projecting the chuck members forward toward the stocker 60.

Referring to FIG. 9, further mounted on a main base plate 190 is a slider 192 which is operatively connected to the upper and lower base members 162 and 164 and adapted to be moved in opposite direction thereto. The slider 192 has a cam member 191 engaged with a roller 182 of a disc supporter 180. The disc supporter 180 is adapted to pivot in a vertical direction about a horizontal shaft 183 which is mounted on the main base 190. The disc supporter 180 has a projection 181 at an end thereof which engages with a center hole 61a (FIG. 16) of a disc 61.

On either side of the base plate 160 is provided a chuck guide members 210 and 212 and a rotary guide member 215 (FIG. 7). The guide members 210, 212 and 215 has guide recesses 210a, 212a and 215a, respectively, each of which is adapted to engage with the guide projection 168a of the upper chuck member 168.

As shown in FIG. 8, the rotary guide member 215 is constructed to slew about a pin 217. The rear end of the rotary guide member 215 engages with an end 216b of a lever 216 having a pivot at a center thereof. The other end 216a of the lever 216 is disposed adjacent the slant portion 168b of the upper chuck member 168.

Figure 15:
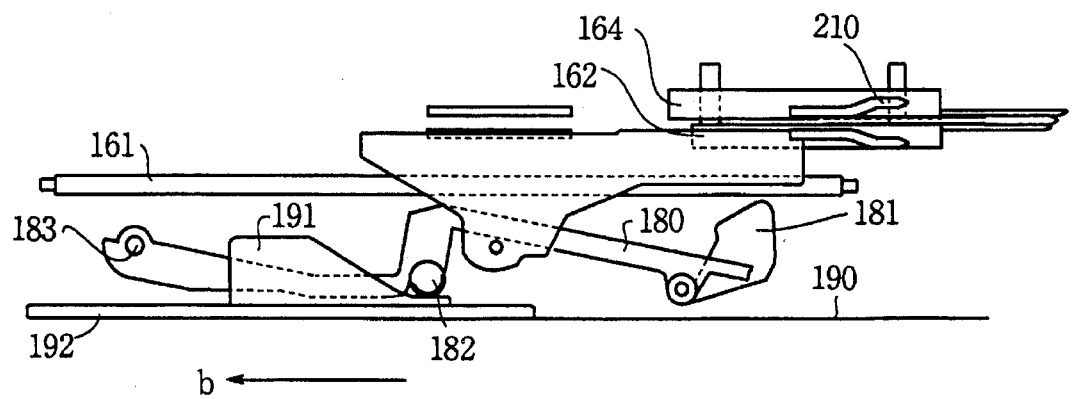
FIG. 15 is a sectional view of a part of the disc carrier when the chuck members are in the protruded position shown in FIG. 13.

The operation of the disc carrier 90 is described hereinafter. The base 100 is vertically transported in the case 50 of the disc changer 1a to confront the disc carrier 90 with one of the stockers 60 wherein the selected disc 61 is stored. The disc carrier 90 is rotated to the left as shown in FIG. 12, or to the right, and at the same time protrudes forward to face the selected disc 61. Accordingly, as shown in FIGS. 14a, 14b and 15, the tip ends of the chuck guide member 210 are inserted between the disc holders 130 above and below the disc holder holding the disc 61 to be retrieved.

Thereafter, the motor 200 is driven, thereby moving the guide member 171 in the direction c shown in FIG. 10a. The slider 172 slides over the slant portion 174 and on the abutting member 175, causing the chuck holder 165 to be depressed downward against the urging of the springs 170. The space between the lower chuck member 167 and the upper chuck member 168 is hence enlarged, thereby allowing the peripheral portion of the disc 61 to be inserted therein.

Figure 13:
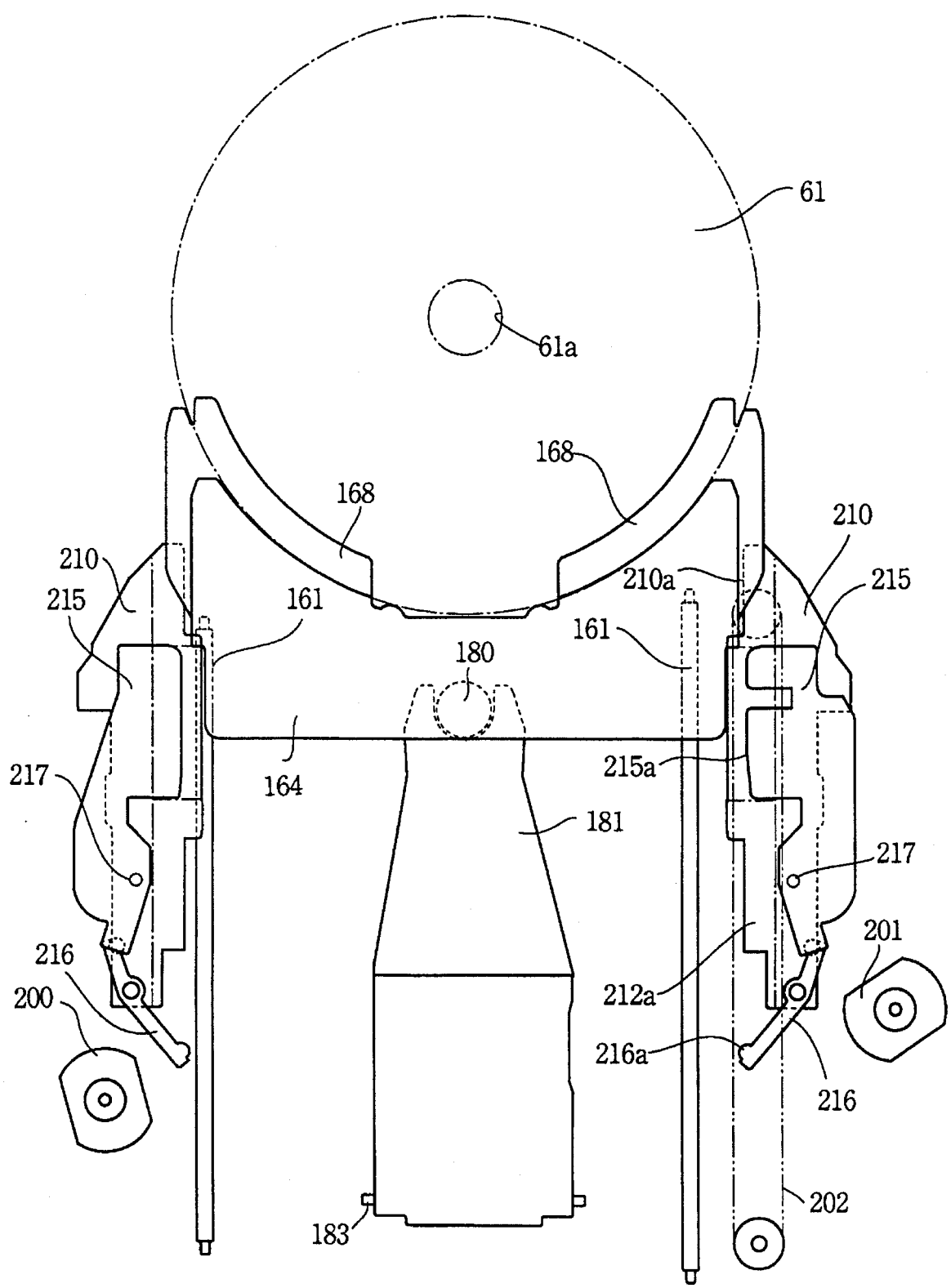
FIG. 13 is a plan view of the disc carrier, a chuck members thereof in a protruded position.
Figure 14:
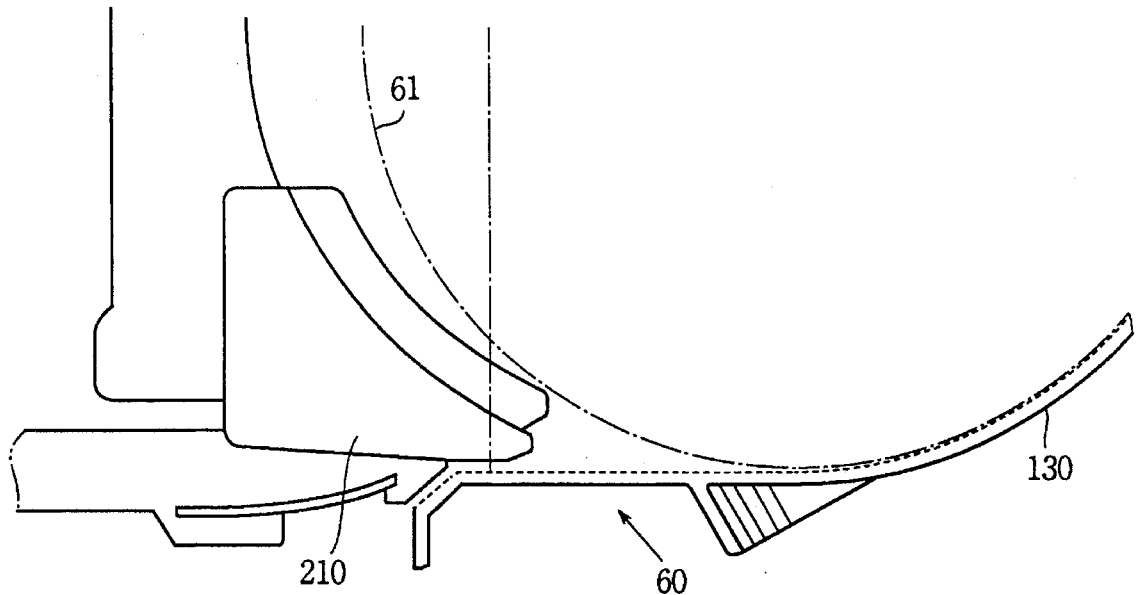
FIG. 14a is a schematic plan view showing a part of the disc carrier when retrieving a disc.
FIG. 14b is an illustration showing a part of the disc carrier when the disc is grasped.
Figure 14:
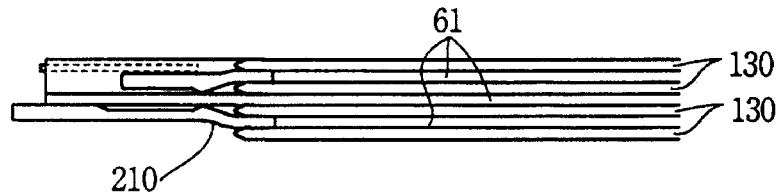

When the motor 201 is driven the upper and lower base members 164 and 162 slide forward, that is in the direction a, on the guide rails 161. Accordingly, the upper and lower chuck members 168 and 167 protrude in the same direction as shown in FIG. 13, guided by the guide projections 168a which slide along the guide recesses 210a, 212a, and 215a of the guide members 210, 212 and 215, respectively. Thus, a peripheral portion of the disc 61 is inserted between the upper and lower chuck members 168 and 167. When the disc is further inserted and pushes the abutting pin 177, the rotating member 176 is rotated in the clockwise direction against the urging of the spring 178.

The motor 200 is then driven in the opposite direction to move the guide member 171 in the direction d to its original position. Hence as shown in FIG. 10b, the distance between the upper and lower chuck members 168 and 167 is decreased, so that the disc 61 is firmly gripped.

As the motor 201 is driven in the opposite direction, the upper and lower base members 164 and 162 are retracted in the direction b, thereby pulling the disc 61 out of the disc holder 130 and hence out of the stocker 60. Since the guide projection 168a of upper chuck member 168 slide along the recesses 210a, 212a and 215 of the guide members 210, 212, and 215, the disc 61 can be stably transported.

Figure 16:
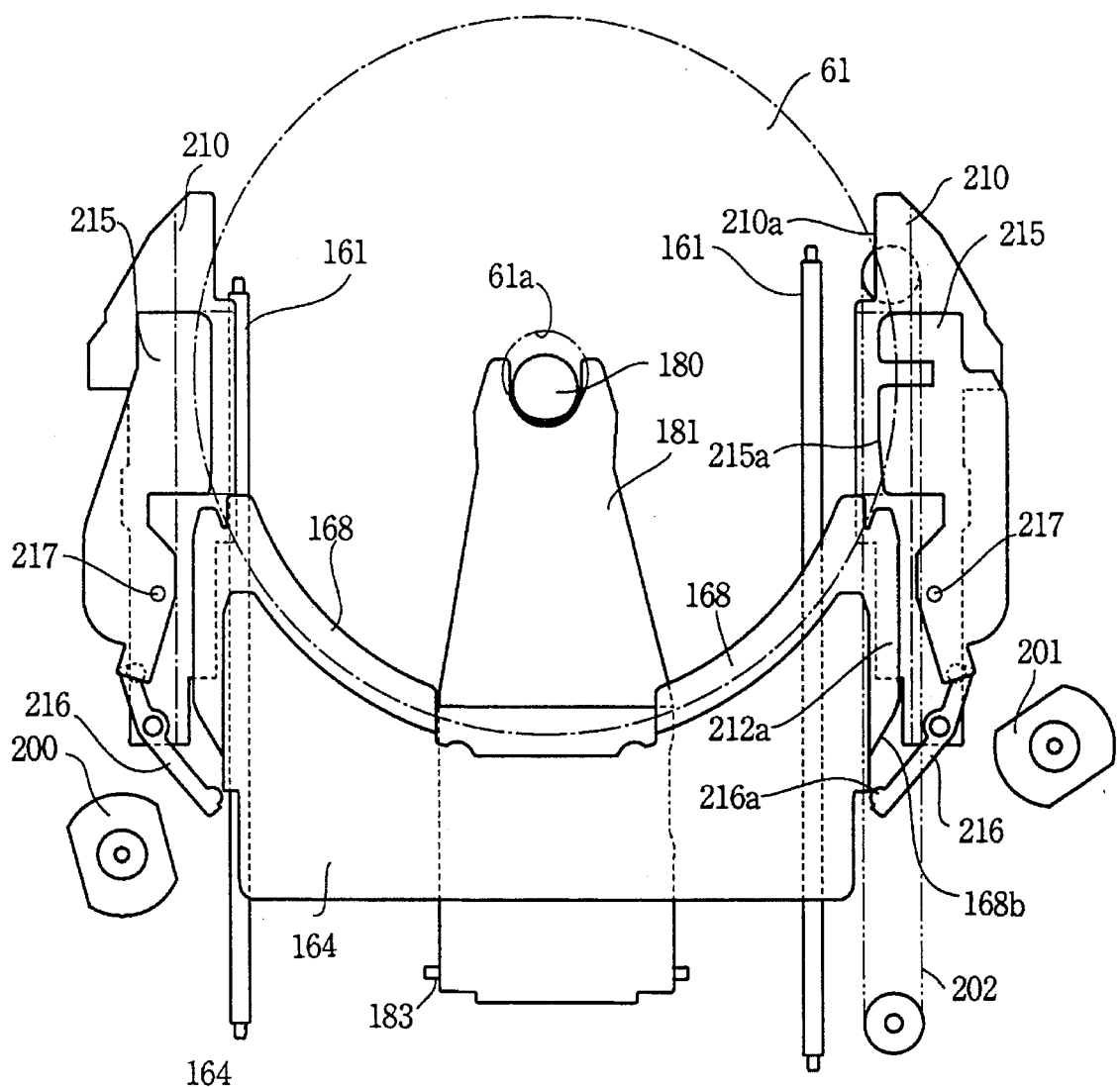
FIG. 16 is a plan view of the disc carrier, the chuck members thereof in a retracted position.
Figure 17:
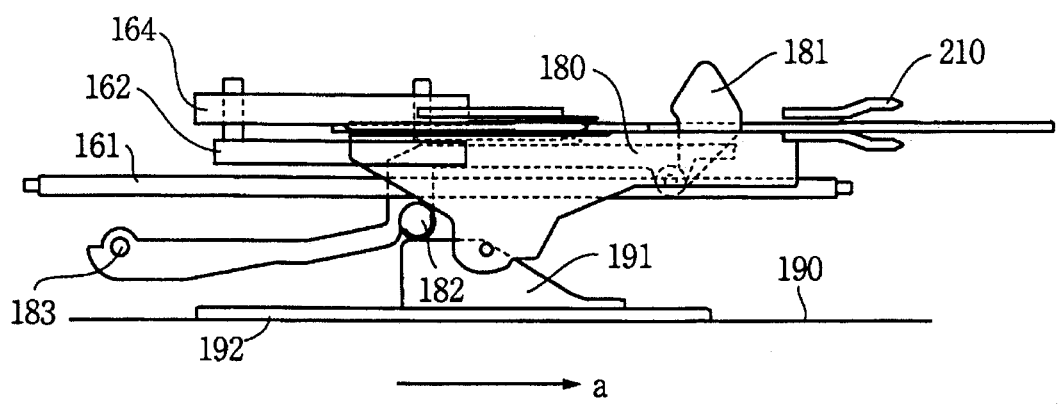
FIG. 17 is a sectional view of a part of the disc carrier when the chuck members are in the retracted position shown in FIG. 16.

When the disc 61 is almost but not quite completely set in the disc carrier 90 as shown in FIG. 16, the slider 192, in synchronism with the upper and lower base members 164 and 162, moves in the direction a as shown in FIG. 17. Namely, the roller 182 rolls on the slanted portion of the cam member 191 so as to be lifted. The disc supporter 180 which engages with the roller 182 is accordingly rotated upward about the shaft 183, causing the projection 181 thereof to be engaged in the hole 62 of the disc 61 from beneath.

When the disc carrier 90 stops operating, the base 100 is lowered to one of the player units 110 and 120.

Figure 18:
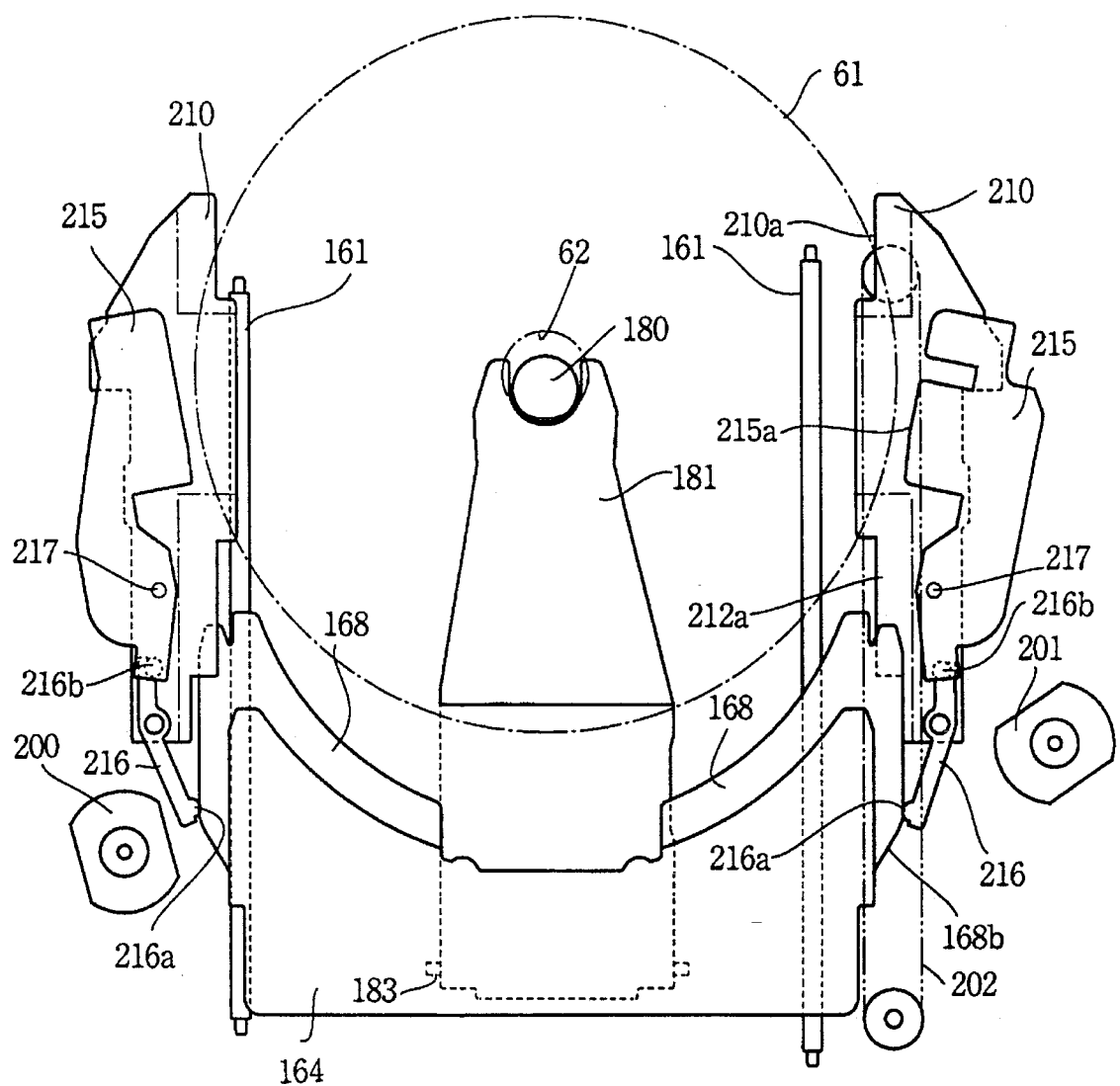
FIG. 18 is a plan view of the disc carrier, the chuck members thereof in a further retracted position.
Figure 19:
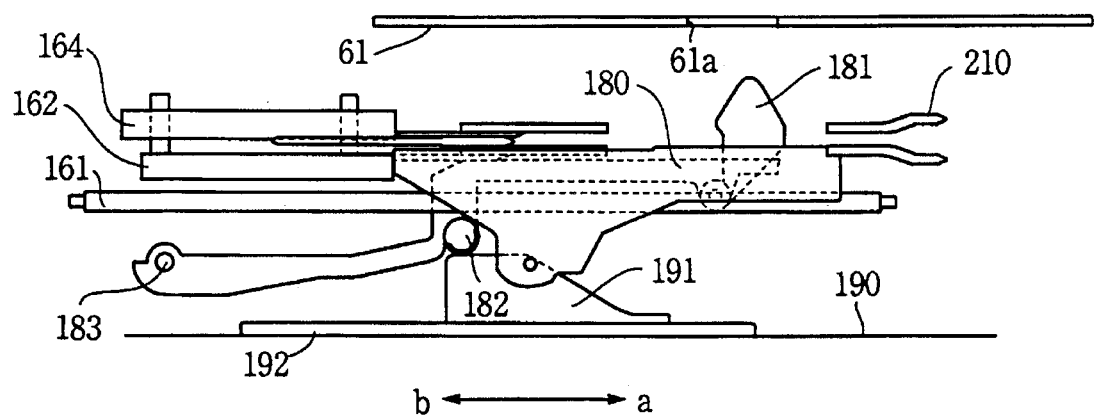
FIG. 19 is a sectional view of a part of the disc carrier when the chuck members are in the retracted position shown in FIG. 18.
Figure 20:
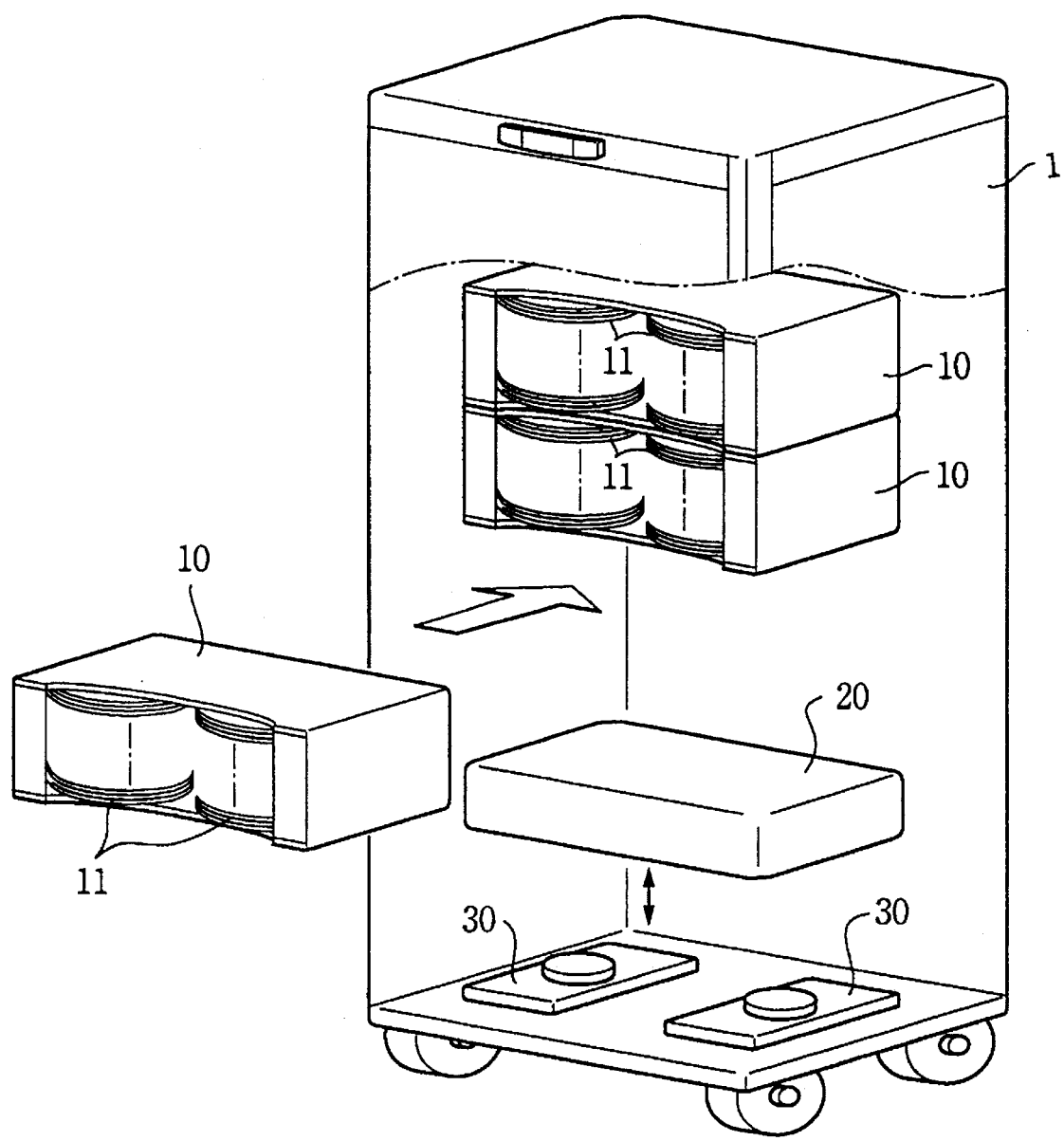
FIG. 20 is a partially cutaway perspective view of a conventional disc changer.
Figure 21:
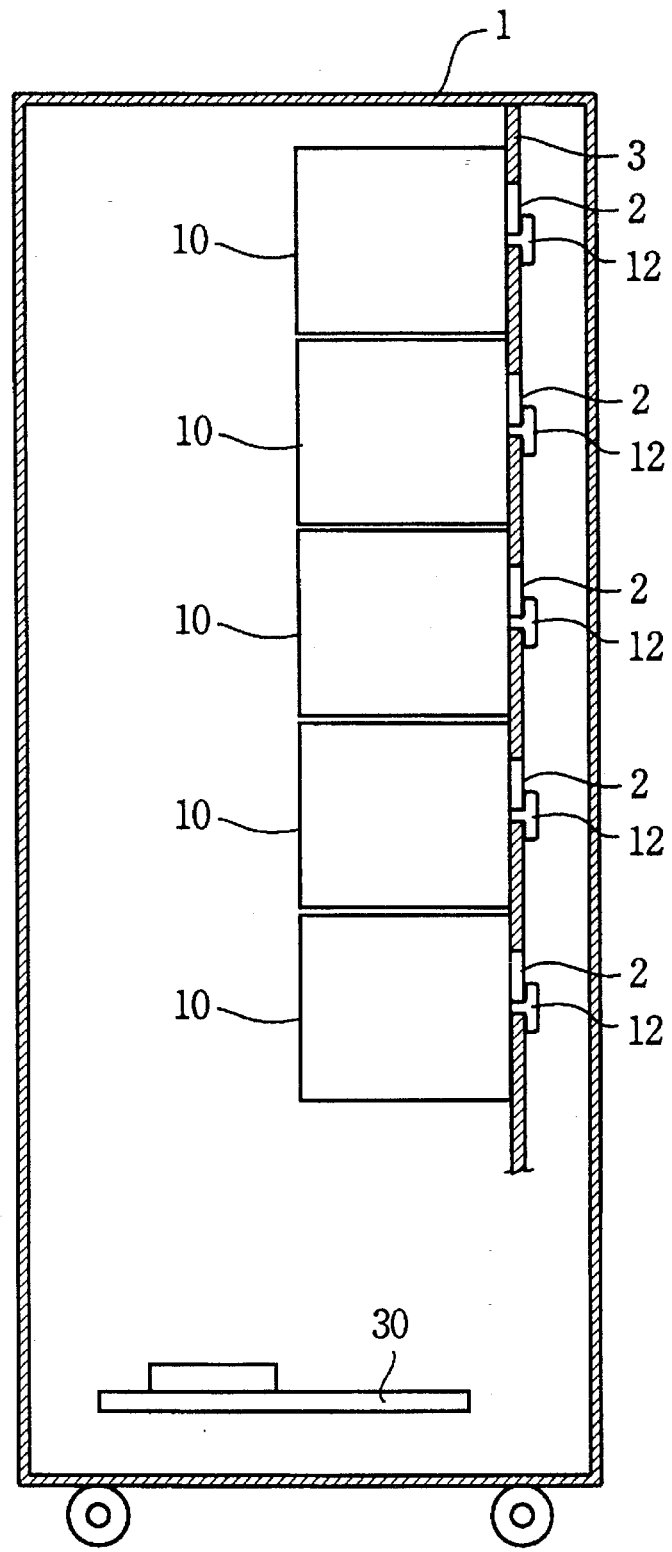
FIG. 21 is a sectional view of the conventional disc changer.
Figure 22:
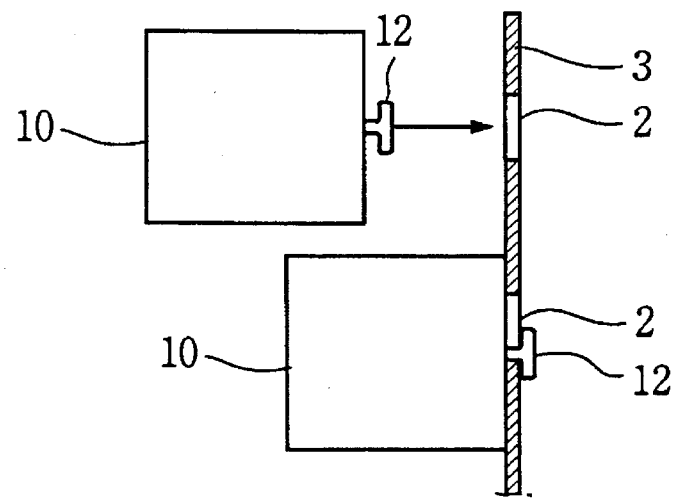
FIGS. 22 and 23 are illustrations explaining the loading operation of stockers in the disc changer.
Figure 23:
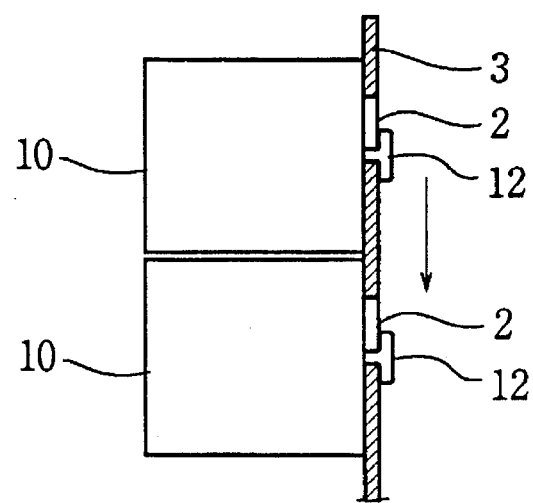

In order to exchange the discs in the stocker 60 while the stocker is mounted in the disc changer 1a, the upper and lower base members 164 and 162 are further moved in the direction b when the disc 61 is clamped, so that the front ends of the upper and lower chuck members 168 and 167 are released from the disc as shown in FIG. 18. The slant portion 168b of the upper chuck member 168 engages with the end 216a of the lever 216, thereby rotating the lever 216 inwardly, that is in the counterclockwise direction in the case of the right side lever 216 in FIG. 18. Due to the engagement of the rotary guide member 125 with the end 216b of the lever 216, the guide member 215 rotates outwardly, that is, in a clockwise direction about the pin 217, so that the disc 61 is released from the recess 215a. Thus, the disc 61 can be taken out and another disc set in its place.

The disc changer 1a of the present invention is provided with an addressing system. Namely, when the user addresses an disc which is to be exchanged, the disc carrier 90 is moved to confront the stocker 60 storing the disc. The disc is retrieved as described above, and a new disc is set in the disc carrier. When the new disc is addressed, the disc carrier 90 transports the disc to the appropriate stocker 60. Hence the operation for exchanging the discs becomes more reliable than when carried out manually.

In accordance with the present invention, the stocker can be easily loaded in the disc changer and taken out therefrom at any desired position without removing other stockers.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A structure for supporting disc stockers in a case of a disk changer, each of the disc stockers has opposite side walls and is capable of storing a plurality of discs, the structure comprising:

a pair of side panels provided in the case;

supporting members provided on each of the side panels for supporting the disc stockers;

a lock device mounted on each of the side walls of the disc stockers;

each of the lock devices comprising a lock lever, with a pair of vertically oblong holes, movably mounted on the side wall and having a locking hook, and a release lever; and a pair of guide pins provided on each of the side walls of each disc stocker, wherein each pair of guide pins slidably engages a corresponding pair of the vertically oblong holes provided in the lock lever, such that the lock lever is movable between a locking state and a unlocking state, wherein the unlocking state is disposed below the locking state;

a plurality of lock pins provided on the side panels so as to engage with the locking hooks when the disc stockers are inserted in the case such that when the lock lever of a particular disc stocker is in the locking state the corresponding lock pin is capable of being disposed on a recess side of the locking hook so that the particular disc stocker is locked in the case;

the release lever being pivotally mounted on the side wall, and having an elongated form operatively connected to the lock lever at an inner end and a free end disposed opposite the inner end, and being arranged such that the release lever is pivotally movable between a locking state and a unlocking state, wherein when the release lever is in the locking state the lock lever is in the locking state and when the release lever is pivotally moved to the unlocking state through the movement of the free end of the release lever to the unlocking state that is above the free end in the locking state, the inner end of the release lever moves with the lock lever to the unlocking state below the locking state so that the locking hook disengages the lock pin and the disc stocker may be removed from the case.

2. The structure according to claim 1 wherein the locking hook comprises a slanted portion and recess adjacent the slanted portion.

* * * * *